United States Patent [19]

Kuze et al.

[11] Patent Number: 5,041,523

[45] Date of Patent: Aug. 20, 1991

[54] PROCESS FOR PRODUCTION OF BRANCHED POLYCARBONATE

[75] Inventors: Shigeki Kuze; Eiichi Terada, both of Ichihara, Japan

[73] Assignee: Idemitsu Petrochemical Co., Ltd., Tokyo, Japan

[21] Appl. No.: 483,444

[22] Filed: Feb. 22, 1990

[30] Foreign Application Priority Data

Mar. 14, 1989 [JP] Japan .................................. 1-59635

[51] Int. Cl.$^5$ .............................................. C08G 64/20
[52] U.S. Cl. ...................................... 528/204; 526/68; 528/125; 528/126; 528/128; 528/198; 528/199; 528/201
[58] Field of Search ............... 528/204, 201, 125, 128, 528/198, 199; 526/68

[56] References Cited

U.S. PATENT DOCUMENTS 4,900,803 2/1990 Petri ..................................... 528/204

Primary Examiner—Harold D. Anderson
Attorney, Agent, or Firm—Frishauf, Holtz, Goodman & Woodward

[57] ABSTRACT

A process for producing a branched polycarbonate by an interfacial polycondensation method comprising condensing a first reaction mixture comprising an inert organic solvent, an alkaline aqueous solution of divalent phenol, a branching agent, and phosgene, the branching agent having a partition coefficient of at least 1, wherein the partition coefficient is defined as the ratio of the concentration in inert organic solvent/concentration in water, to form a second mixture containing a polycarbonate oligomer or a polycarbonate and unreacted branching agent, separating the second mixture into an organic solvent layer and an aqueous layer which contains the unreacted branching agent, extracting the unreacted branching agent from the aqueous layer with inert organic solvent and recycling the inert organic solvent which contains the unreacted branching agent extracted from the aqueous layer to the first reaction mixture. The present invention has the advantages of preventing waste water pollution and at the same time, increasing the efficiency of use of the branching agent, because it permits the efficient extraction recovery of the unreacted branching agent contained in waste water. The branched polycarbonate obtained by the process by the present invention has good melt characteristics, is great in dependency on a rate of shear, and has a small drawn down. Thus, the branched polycarbonate is suitable for extrusion molding.

19 Claims, No Drawings

5,041,523

PROCESS FOR PRODUCTION OF BRANCHED POLYCARBONATE

FIELD OF THE INVENTION

Background Information

The present invention relates to an improved process for production of branched polycarbonate. More particularly, it is concerned with a process for production of branched polycarbonate in which a branching agent can be efficiently utilized and an interfacial polycondensation method capable of preventing waste water pollution is employed.

In recent years, polycarbonate has been widely used in production of electric parts, mechanical parts, various containers and so forth, as engineering plastics excellent in heat resistance, impact resistance, transparency and so forth.

The usual polycarbonate, however, has the following features: when melted, it behaves as a Newtonian fluid; its apparent viscosity does not depend on a rate of shear; and melt elasticity and melt strength are greatly small. Thus the polycarbonate suffers disadvantages in that it is difficult to obtain a large sized extruded parison in a stabilized manner in extrusion molding, particularly in blow molding using an extrusion molding machine.

Two methods have heretofore been known to improve melt characteristics of polycarbonate: one is to mix two kinds of polycarbonates having greatly different molecular weights, and the other is to branch polycarbonate. As the latter method to produce branched polycarbonate, a method in which a polyfunctional organic compound having at least three functional groups is used along with divalent phenol (Japanese Patent Publication No. 17149/1969), a method in which reactivity of a branching agent is increased (Japanese Patent Application Laid-Open Nos. 185619/1983, 4,5318/1984, 47228/1984 and 163919/1985), a method in which various branching agents are used to improve reactivity, efficiency of a branching agent, hue, melt strength and so forth (Japanese Patent Application Laid-Open Nos. 10071/1987, 30524/1988 and 16825/1989), and so forth are proposed.

However, in production of branched polycarbonate using branching agents as described above, the branching agents are poor in reactivity and even in the methods in which branching agents having increased reactivity, an unreacted branching agent is inevitably left. As a result, particularly when a branching agent having poor lipophilic properties, such as phloroglucin or trimellitic acid, is used, an unreacted branching agent mostly enters waste water, causing waste water pollution, and thus a problem arises in that a complicated step for disposal of waste water is needed.

For production of branched polycarbonate, an interfacial polycondensation method is usually employed. As the interfacial polycondensation method, generally, a method in which phosgene is introduced into a mixture containing an inert organic solvent, an alkaline aqueous solution of divalent phenol, a branching agent and monovalent phenol to be used if necessary to thereby form a polycarbonate oligomer, the resulting reaction mixture is separated into an organic layer containing the polycarbonate oligomer and an aqueous layer, and then the organic layer containing the polycarbonate oligomer is contacted with an alkaline aqueous solution of divalent phenol to form high molecular weight branched polycarbonate, or a method in which phosgene is introduced into a mixture containing an inert organic solvent, an alkaline aqueous solution of divalent phenol, and monovalent phenol to be used if necessary to thereby form a polycarbonate oligomer, a branching agent is added thereto to cause precondensation, the resulting reaction mixture is separated into an organic layer containing the polycarbonate precondensate and an aqueous layer, and the organic layer containing the polycarbonate precondensate is contacted with an alkaline aqueous solution of divalent phenol to form high molecular weight branched polycarbonate is employed.

In these methods, however, a major portion of an unreacted branching agent migrates to the aqueous layer in separation of the reaction mixture into the organic layer and the aqueous layer, usually it is not recovered and abandoned along with waste water. Thus, COD (chemical oxygen demand) of waste water usually increases to more than 100 mg/L (L=liter). This is disadvantageous from an economic standpoint because a complicated process for disposal of waste water is needed and the efficiency of use of the branching agent is low.

SUMMARY OF THE INVENTION

The present invention is intended to overcome the above problems of the prior art, and an object of the present invention is to provide a process for production of branched polycarbonate by an interfacial polycondensation method, in which an unreacted branching agent contained in an aqueous layer separated after the reaction is extracted and recovered with high efficiency and recycled to the reaction system for reuse, so that the efficiency of use of the branching agent is increased and waste water pollution is prevented.

It has been found that an unreacted branching agent contained in an aqueous layer can be extracted and recovered with an inert organic solvent to be used in the reaction, with high efficiency by employing a branching agent having a partition coefficient (ratio of concentration in an inert organic solvent used to concentration in water) of at least 1.

The present invention relates to a process for producing branched polycarbonate by an interfacial polycondensation method using an inert organic solvent, an alkaline aqueous solution of divalent phenol, a branching agent, and phosgene, which process is characterized in that as the branching agent, one having a partition coefficient (ratio of concentration in inert organic solvent to concentration in water) of at least 1 is used, and after separation of the reaction mixture containing a polycarbonate oligomer or polycarbonate and an unreacted branching agent into an organic solvent layer and an aqueous layer, the unreacted branching agent contained in the aqueous layer is extracted with the inert organic solvent and the resulting unreacted branching agent-containing inert organic solvent is returned to the reaction system for reuse.

DETAILED DESCRIPTION OF THE INVENTION

The inert organic solvent to be used in the process of the present invention is not critical in type; any desired one of inert organic solvents commonly used in production of polycarbonate by interfacial polycondensation can be used. As such solvents, chlorinated hydrocarbons such as dichloromethane (methylene chloride), 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane, hexachloroethane and chlorobenzene, acetophenone, and the like can be used. These solvents can be used alone or in combination with each other. Of these solvents, methylene chloride is particularly suitable.

As the divalent phenol, bisphenols are preferred. Particularly preferred is 2,2-bis(4-hydroxydiphenyl)-propane (bisphenol A). This bisphenol A may be substituted, partially or fully, with another divalent phenol. Divalent phenols other than bisphenol A include dihydroxyarylalkanes such as bis(4-hydroxyphenyl)methane, bis(4-hydroxyphenyl)phenylmethane, bis(4-hydroxyphenyl)naphthylmethane, bis(4-hydroxyphenyl)-(4-isopropylphenyl)methane, diphenyl-bis(4-hydroxyphenyl)methane, bis(3,5-dichloro-4-hydroxyphenyl)methane, bis(3,5-dimethyl-4-hydroxyphenyl)methane, 1,1-bis(4-hydroxyphenyl)ethane, 1-naphthyl-1,1-bis(4-hydroxyphenyl)ethane, 1-phenyl-1,1-bis(hydroxyphenyl)ethane, 1,2-bis(4-hydroxyphenyl)ethane, 2-methyl-1,1-bis(4-hydroxyphenyl)propane, 2,2-bis(3,5-dimethyl-4-hydroxyphenyl)propane, 1-ethyl-1,1-bis(4-hydroxyphenyl)-propane, 2,2-bis(3,5-dichloro-4-hydroxyphenyl)propane, 2,2-bis(3,5-dibromo-4-hydroxyphenyl)propane, 2,2-bis(3-chloro-4-hydroxyphenyl)propane, 2,2-bis(3-methyl-4-hydroxyphenyl)propane, 2,2-bis(3-fluoro-4-hydroxyphenyl)propane, 1,1-bis(4-hydroxyphenyl)butane, 2,2-bis(4-hydroxyphenyl)butane, 1,4bis(4-hydroxyphenyl)butane, 2,2-bis(4-hydroxyphenyl)pentane, 4-methyl-2,2-bis(4-hydroxyphenyl)pentane, 1,1-bis(4-hydroxyphenyl)cyclohexane, 1,1-bis(3,5-dichloro-4-hydroxyphenyl)cyclohexane, 2,2-bis(4-hydroxyphenyl)hexane, 4,4-bis(4-hydroxyphenyl)heptane, 2,2-bis(4-hydroxyphenyl)nonane, 1,10-bis(4-hydroxyphenyl)decane, and 1,1-bis(4-hydroxyphenyl)cyclododecane; dihydroxyarylsulfones such as bis(4-hydroxyphenyl)sulfone, bis(3,5-dimethyl-4-hydroxyphenyl)sulfone, and bis(3-chloro-4-hydroxyphenyl)sulfone; dihydroxyaryl ethers such as bis(4-hydroxyphenyl) ether and bis(3,5-dimethyl-4-hydroxyphenyl) ether; dihydroxyarylketones such as 4,4'-dihydroxybenzophenone and 3,3',5,5'-tetramethyl-4,4'-dihydroxybenzophenone; dihydroxyaryl sulfides such as bis(4-hydroxyphenyl) sulfide, bis(3-methyl-4-hydroxyphenyl) sulfide, and bis(3,5-dimethyl-4-hydroxyphenyl) sulfide, dihydroxyaryl sulfoxides such as bis(4-hydroxyphenyl) sulfoxide; dihydroxydiphenyls such as 4,4'-dihydroxydiphenyl; dihydroxybenzenes such as hydroquinone, resorcinol and methylhydroquinone, and dihydroxynaphthalenes such as 1,5-dihydroxynaphthalene and 2,6-dihydroxynaphthalene. These divalent phenols can be used alone or in combination with each other.

The branching agent to be used in the present invention must be a compound having at least three functional groups and a partition coefficient (ratio of concentration in inert organic solvent used to concentration in water (concentration in inert organic solvent/concentration in water)) of at least 1. If the branching agent having the partition coefficient of less than 1 is used as the branching agent, an unreacted branching agent contained in an aqueous layer cannot be extracted efficiently with the inert organic solvent.

On the other hand, if the partition coefficient of the branching agent to be used as the branching agent in the present invention is too high, it becomes difficult to remove the unreacted branching agent from the inert organic solvent.

As the branching agent, it is preferred to use the branching agent having the partition coefficient of 3 to 200.

Branching agents which can be used when the inert organic solvent used is methylene chloride include 2,4,4'-trihydroxybenzophenone, 2,2',4,4'-tetrahydroxybenzophenone, 2,4,4'-trihydroxydiphenyl ether, 2,2',4,4'-tetrahydroxydiphenyl ether, 2,4,4'-trihydroxydiphenyl-2-propane, 2,2-bis(2,4-dihydroxy)propane, 2,2',4,4'-tetrahydroxydiphenylmethane, 2,4,4'-trihydroxydiphenylmethane, 1-[$\alpha$-methyl-$\alpha$-(4-hydroxyphenyl)ethyl]-4-[$\alpha'$,$\alpha'$-bis(4-hydroxyphenyl)ethyl benzene, $\alpha$,$\alpha'$,$\alpha''$-tris(4-hydroxyphenyl)-1,3,5-triisopropylbenzene, 2,6-bis(2'-hydroxy-5'-methylbenzyl)-4-methylphenol, 4,6-dimethyl-2,4,6-tris(4'-hydroxyphenyl)-heptene-2,4,6-dimethyl-2,4,6-tris(4'-hydroxyphenyl)-heptane, 1,3,5-tris(4'-hydroxyphenyl)-benzene, 1,1,1-tris(4'-hydroxyphenyl)-ethane, 2,2-bis[4,4-bis(4'-hydroxyphenyl)cyclohexyl]-propane, 2,6-bis(2'-hydroxy-5'-isopropylbenzyl)-4-isopropylphenol, bis[2-hydroxy-3-(2'-hydroxy-5'-isopropylbenzyl)-5-methylphenyl]methane, tetrakis(4-hydroxyphenyl)methane, tris(4-hydroxyphenyl)phenylmethane, 2',4',7-trihydroxyflavan, 2,4,4-tri-methyl-2',4',7-trihydroxyflavan, 1,3-bis(2',4'-dihydroxyphenylisopropyl)benzene and the like. These branching agents can be used alone or in combination with each other. The amount of the branching agent used is chosen in a manner that the branching agent unit content of the resulting branched polycarbonate is usually 0.05 to 2.0 mol %, preferably 0.1 to 1.0 mol % per the divalent phenol unit.

The partition coefficient of the branching agent can be determined as follows:

To a mixture (1:1 by weight) of water and an inert organic solvent is added 0.1% by weight of a branching agent, and the resulting mixture is agitated for 10 minutes by the use of an agitator. Then a ratio of concentration in inert organic solvent layer to concentration in aqueous layer (concentration in inert organic solvent layer/concentration in aqueous layer) is measured.

In the process of the present invention, branched polycarbonate is produced by the usual interfacial polycondensation method except that an additional operation of extracting an unreacted branching agent contained in an aqueous layer separated with an inert organic solvent used in the reaction is employed. In this case, a co-oligomerization method or a pre-condensation method is preferably employed.

A preferred example of the co-oligomerization method will hereinafter be explained.

A divalent phenol and a branching agent are dissolved in an aqueous solution of an alkali metal hydroxide to prepare an alkaline aqueous solution of divalent phenol containing the branching agent. Phosgene is introduced into a mixture of the aqueous solution as prepared above and an inert organic solvent to form a polycarbonate co-oligomer.

As the above alkali metal hydroxide, sodium hydroxide, potassium hydroxide, lithium hydroxide, cesium hydroxide and the like can be used. Of these compounds, sodium hydroxide and potassium hydroxide are preferred. Particularly preferred is sodium hydroxide.

In this reaction, a molecular weight controller and a catalyst, for example, can be used if necessary. Preferred examples of the molecular weight controller are monovalent phenols, e.g., phenol; alkylphenol having 1 to 4 carbon atoms, such as p-cresol or p-tert-butyl phenol; halogenated phenol such as pentabromophenol and the like; and p-cumylphenol. Preferred examples of the catalyst are tert-amines and halides of quaternary ammonium.

The reaction temperature is usually 0 to 50° C. and preferably 5 to 40° C. The reaction time is about 10 minutes to 3 hours.

The polycarbonate co-oligomer thus obtained is a co-oligomer having a hydroxyl group and a chloroformic acid ester radical (—OCOCl) at the terminal of the molecle thereof. The ratio of the hydroxyl group to the chloroformic acid ester radical can be changed at will by suitably choosing a method of introducing phosgene, a concentration of an alkali hydroxide aqueous solution of divalent phenol, a reaction temperature, and so forth. The degree of polymerization of the co-oligomer can be controlled by suitably choosing suitably the type and amount of the above molecular weight controller; usually it is not more than 20, with the range of about 2 to 10 being preferred.

Then the reaction mixture thus obtained, containing the polycarbonate co-oligomer and the unreacted branching agent is separated into an organic layer and an aqueous layer and, thereafter, the unreacted branching agent in the aqueous layer is extracted with the inert organic solvent used in the reaction and recovered. At this time, the pH of the aqueous layer is adjusted usually to not more than 10, preferably to not more than 5. The ratio of the aqueous layer to the inert organic solvent is chosen usually within a range of 1:0.05 to 1:2 and preferably within a range of 1:0.1 to 1:1. The inert organic solvent containing the unreacted branching agent as obtained in this extraction treatment is returned to the above reaction system.

The organic layer containing the polycarbonate co-oligomer is contacted with an alkaline aqueous solution of divalent phenol and is subjected to interfacial polycondensation at a temperature of usually 0 to 50° C., preferably 5 to 40° C. for about 10 minutes to 6 hours. Then an operation of recovering the formed polymer is applied by the usual method to obtain the desired branched polycarbonate. In the above interfacial polycondensation reaction, a catalyst as described above can be used if necessary.

A preferred example of the pre-condensation method will hereinafter be explained.

A divalent phenol is dissolved in an aqueous solution of an alkali metal hydroxide to prepare an alkaline aqueous solution of divalent phenol. Phosgene is introduced into a mixture of the aqueous solution obtained above and an inert organic solvent to form a polycarbonate oligomer.

As the alkali metal hydroxide, those described above can be used. In addition, a molecular weight controller and a catalyst as described above can be used. The reaction temperature is chosen usually within a range of 0 to 50° C. and preferably within a range of 5 to 40° C. The reaction time is about 10 minutes to 3 hours. In this manner, a polycarbonate oligomer having usually a degree of polymerization of not more than 20 and preferably a degree of polymerization of about 2 to 10 is obtained.

Then, to the reaction mixture containing the polycarbonate oligomer, a branching agent is added, and pre-condensation is carried out at a temperature of usually 0 to 50° C. and preferably 5 to 40° C. for about 10 minutes to 3 hours. At this point, a catalyst as described above can be added to the reaction system if necessary. In addition, a part of the alkaline aqueous solution of divalent phenol may be added within the range that does not complete the polycondensation reaction.

The reaction mixture thus obtained, containing the polycarbonate pre-condensate and the unreacted branching agent is separated into an organic layer and an aqueous layer. The unreacted branching agent contained in the aqueous layer is extracted with the inert organic solvent used in the reaction under the same conditions as in the above co-oligomerization method and recovered. The inert organic solvent containing the unreacted branching agent as obtained above is then returned to the above pre-condensation step.

The organic layer containing the polycarbonate pre-condensate, on the other hand, is contacted with an alkaline aqueous solution of divalent phenol, and interfacial polycondensation is carried out at a temperature in a range of usually 0 to 50° C., preferably 5 to 40° C. for about 10 minutes to 6 hours. Then the formed polymer is recovered by the usual method to obtain the desired branched polycarbonate. In the interfacial polycondensation method, a catalyst as described above can be used if necessary.

The branched polycarbonate thus obtained has good melt characteristics, is great in dependency on a rate of shear, and has a small draw down. Thus the branched polycarbonate is suitable for extrusion molding, particularly for blow molding using an extrusion molding machine and can provide high quality sheets and structures.

Moreover the process of the present invention has advantages of preventing waste water pollution and at the same time, increasing the efficiency of use of the branching agent because it permits, efficient extraction recovery of the unreacted branching agent contained in waste water.

In accordance with the process of the present invention, use of a polyfunctional compound having a specified partition coefficient as a branching agent permits efficient extraction and recovery of an unreacted branching agent in an aqueous layer which has heretofore been abandoned, with an inert organic solvent used in the reaction, and moreover, since the inert organic solvent containing the unreacted branching agent can be recycled and reused, waste water pollution is prevented and at the same time, the efficiency of use of the branching agent can be increased.

Branched polycarbonate obtained by the process of the present invention has good melt characteristics, is great in dependency on a rate of shear, and has a small draw down, and thus it is suitable for use in extrusion molding, particularly for blow molding using an extrusion molding machine.

The present invention is described in greater detail with reference to the following examples.

EXAMPLE 1

In a 50-liter vessel equipped with a stirrer, 8 L (L=liter) of a methylene chloride solution of a polycarbonate oligomer prepared from p-tert-butylphenol, bisphenol A and phosgene (concentration 320 g/L, chloroformate group concentration 0.7 mol/L, number average molecular weight 850), 15.9 g (0.069 mol) of 2,4,4'-trihydroxybenzophenone as a branching agent, 4.4 g (0.043 mol) of triethylamine, and 368 g of a 3% by weight aqueous solution of sodium hydroxide were placed, and stirred for 50 minutes. The resulting mixture was separated into an aqueous layer and a methylene chloride layer. To this aqueous layer, 19.6 L of water was added.

The amount of an unreacted branching agent in the aqueous layer as determined by a UV measuring method was 27 mg/L. COD (chemical oxygen demand) as calculated from the amount of the unreacted branching agent was 50 mg/L.

Then, 20 L of methylene chloride was added to the aqueous layer and after adjustment to a pH of not more than 5 with diluted hydrochloric acid, an extraction operation was carried out for 10 minutes.

The amount of the unreacted branching agent after the above extraction operation as determined by the UV measuring method was 2 mg/L. COD as calculated from the amount of the unreacted branching agent was 4 mg/L.

To the organic layer, on the other hand, were added 573 g (2.5 mol) of bisphenol A, 4,000 g of a 0.0725% by weight aqueous solution of sodium hydroxide, and 6 L of methylene chloride, and interfacial polycondensation was carried out for 60 minutes. Then the reaction mixture was separated into an aqueous layer and a methylene chloride layer containing the formed polymer. The methylene chloride layer containing the formed polymer was washed with water, acid (0.1N hydrochloric acid) and water in this order. Then the methylene chloride was distilled away from the methylene chloride layer under reduced pressure at 40° C. to obtain white polycarbonate powder. The viscosity average molecular weight of the polymer was 24,100.

The methylene chloride containing the unreacted branching agent as obtained by extraction was reused by returning it to the reaction system.

The viscosity average molecular weights of the polycarbonates obtained, CODs after extraction with methylene chloride, and partition coefficients of the branching agents used are shown in Table 1.

EXAMPLE 2

In a 50-liter vessel equipped with a stirrer, 70.4 g (0.47 mol) of p-tert-butylphenol, 2,200 g (9.7 mol) of bisphenol A, 15.6 g (0.069 mol) of 2,4,4'-trihydroxybenzophenone as a branching agent, 4.4 g (0.043 mol) of triethylamine, 13.6 L of a 2.0N aqueous sodium hydroxide solution, and 8 L of methylene chloride were placed, and phosgene was blown into the above mixture with stirring for 70 minutes. After the reaction, the reaction mixture was separated into an aqueous layer and a methylene chloride layer. To this aqueous layer, 19.6 L of water was added.

The amount of an unreacted branching agent in the aqueous layer as determined by the UV measuring method was 38 mg/L. COD as calculated from the amount of an unreacted branching agent was 72 mg/L.

To the aqueous layer, 20 L of methylene chloride was added, and after adjustment of pH to not more than 5 with diluted hydrochloric acid, an extraction operation was carried out for 10 minutes.

The amount of the unreacted branching agent in the aqueous layer after extraction as determined by the UV measuring method was 3 mg/L. COD as calculated from the amount of the unreacted branching agent was 6 mg/L.

To the organic layer, on the other hand, 573 g (2.5 mol) of bisphenol A, 4,000 g of a 0.0725% by weight aqueous sodium hydroxide solution, and 6 L of methylene chloride were added. After stirring for 60 minutes, the reaction mixture was separated into an aqueous layer and a methylene chloride layer containing the formed polymer. This methylene chloride layer was washed with water, acid (0.1 N hydrochloric acid) and water in this order. Then the methylene chloride was distilled away from the methylene chloride layer under reduced pressure at 40° C. to obtain white polycarbonate powder. The viscosity average molecular weight of the polycarbonate was 24,700.

The methylene chloride containing the unreacted branching agent as obtained by the above extraction was reused by returning it to the reaction system.

The viscosity average molecular weights of the polycarbonates obtained, CODs after extraction with methylene chloride, and partition coefficients of the branching agents used are shown in Table 1.

EXAMPLE 3

The procedure of Example 1 was repeated with the exception that 1,1,1-tris(4'-hydroxyphenyl)ethane was used as a branching agent.

The amount of the unreacted branching agent and COD before extraction with methylene chloride were 2 mg/L and 5 mg/L, respectively. The amount of the unreacted branching agent and COD after extraction with methylene chloride were both 0 mg/L. The viscosity average molecular weight of the polycarbonate was 26,700.

The viscosity average molecular weights of the polycarbonates obtained, CODs after extraction with methylene chloride, and partition coefficients of the branching agents used are shown in Table 1.

EXAMPLE 4

The procedure of Example 2 was repeated with the exception that 1,1,1-tris(4'-hydroxyphenyl)ethane was used as a branching agent.

The amount of the unreacted branching agent and COD before extraction with methylene chloride were 6 mg/L and 15 mg/L, respectively. The amount of the unreacted branching agent and COD after extraction with methylene chloride were both 0 mg/L. The viscosity average molecular weight of the polycarbonate was 26,500.

The viscosity average molecular weights of the polycarbonates obtained, CODs after extraction with methylene chloride, and partition coefficients of the branching agents used are shown in Table 1.

EXAMPLE 5

The procedure of Example 1 was repeated with the exception that $\alpha,\alpha',\alpha''$-tris(4-hydroxyphenyl)-1,3,5-triisopropylbenzene was used as a branching agent.

The amount of the unreacted branching agent and COD before extraction with methylene chloride were 6 mg/L and 15 mg/L. The amount of the unreacted branching agent and COD after extraction with methylene chloride were both 0 mg/L. The viscosity average molecular weight of the polycarbonate was 27,000.

The viscosity average molecular weights of the polycarbonates obtained, CODs after extraction with methylene chloride, and partition coefficients of the branching agents used are shown in Table 1.

EXAMPLE 6

The procedure of Example 2 was repeated with the exception that $\alpha,\alpha',\alpha''$-tris(4-hydroxyphenyl)-1,3,5-triisopropylbenzene was used as a branching agent.

The amount of the unreacted branching agent and COD before extraction with methylene chloride were 4 mg/L and 10 mg/L, respectively. The amount of the unreacted branching agent and COD after extraction with methylene chloride were both 0 mg/L. The viscosity average molecular weight of the polycarbonate was 26,800.

The viscosity average molecular weights of the polycarbonates obtained, CODs after extraction with methylene chloride, and partition coefficients of the branching agents used are shown in Table 1.

EXAMPLE 7

The procedure of Example 1 was repeated with the exception that 1-[α-methyl-α-(4-hydroxyphenyl)ethyl]-4-[α',α'-bis(4-hydroxyphenyl)ethyl]benzene was used as a branching agent.

The amount of the unreacted branching agent and COD before extraction with methylene chloride were 5 mg/L and 12 mg/L, respectively. The amount of the unreacted branching agent and COD after extraction with methylene chloride were both 0 mg/L. The viscosity average molecular weight of the polycarbonate was 26,800.

The viscosity average molecular weights of the polycarbonates obtained, CODs after extraction with methylene chloride, and partition coefficients of the branching agents used are shown in Table 1.

EXAMPLE 8

The procedure of Example 2 was repeated with the exception that 1-[α-methyl-α-(4-hydroxyphenyl)ethyl]-4-[α=,α'- bis(4-hydroxyphenyl)ethyl]benzene was used as a branching agent.

The amount of the unreacted branching agent and COD before extraction with methylene chloride were 5 mg/L and 12 mg/L, respectively. The amount of the unreacted branching agent and COD were both 0 mg/L. The viscosity average molecular weight of the polycarbonate was 26,500.

The viscosity average molecular weights of the polycarbonates obtained, CODs after extraction with methylene chloride, and partition coefficients of the branching agents used are shown in Table 1.

EXAMPLE 9

The procedure of Example 1 was repeated with the exception that 2,6-bis(2'-hydroxy-5'-methylbenzyl)-4-methylphenol was used as a branching agent.

The amount of the unreacted branching agent and COD before extraction with methylene chloride were 8 mg/L and 20 mg/L, respectively. The amount of the unreacted branching agent and COD after extraction with methylene chloride were both 0 mg/L. The viscosity average molecular weight of the polycarbonate was 27,000.

The viscosity average molecular weights of the polycarbonates obtained, CODs after extraction with methylene chloride, and partition coefficients of the branching agents used are shown in Table 1.

EXAMPLE 10

The procedure of Example 2 was repeated with the exception that 2,6-bis(2'-hydroxy-5'-methylbenzene)-4-methylphenol was used as a branching agent.

The amount of the unreacted branching agent and COD before extraction with methylene chloride were 8 mg/L and 20 mg/L, respectively. The amount of the unreacted branching agent and COD after extraction with methylene chloride were both 0 mg/L. The viscosity average molecular weight of the polycarbonate was 26,800.

The viscosity average molecular weights of the polycarbonates obtained, CODs after extraction with methylene chloride, and partition coefficients of the branching agents used are shown in Table 1.

EXAMPLE 11

The procedure of Example 1 was repeated with the exception that 2,4,4-trimethyl-2',4',7-trihydroxyflavan was used as a branching agent.

The amount of the unreacted branching agent and COD before extraction with methylene chloride were 6 mg/L and 13 mg/L, respectively. The amount of the unreacted branching agent and COD after extraction with methylene chloride were both 0 mg/L. The viscosity average molecular weight of the polycarbonate was 27,200.

The viscosity average molecular weights of the polycarbonates obtained, CODs after extraction with methylene chloride, and partition coefficients of the branching agents used are shown in Table 1.

EXAMPLE 12

The procedure of Example 2 was repeated with the exception that 2,4,4-trimethyl-2',4',7-trihydroxyflavan was used as a branching agent.

The amount of the unreacted branching agent and COD before extraction with methylene chloride were 8 mg/L and 18 mg/L, respectively. The amount of the unreacted branching agent and COD after extraction with methylene chloride were both 0 mg/L. The viscosity average molecular weight of the polycarbonate was 27,000.

The viscosity average molecular weights of the polycarbonates obtained, CODs after extraction with methylene chloride, and partition coefficients of the branching agents used are shown in Table 1.

COMPARATIVE EXAMPLE 1

The procedure of Example 1 was repeated with the exception that phloroglucin was used as a branching agent.

The amount of the unreacted branching agent and COD before extraction with methylene chloride were 108 mg/L and 165 mg/L, respectively. The amount of the unreacted branching agent and COD after extraction with methylene chloride were 105 mg/L and 160 mg/L, respectively. The viscosity average molecular weight of the polycarbonate was 23,200.

The viscosity average molecular weights of the polycarbonates obtained, CODs after extraction with methylene chloride, and partition coefficients of the branching agents used are shown in Table 1.

COMPARATIVE EXAMPLE 2

The procedure of Example 2 was repeated with the exception that phloroglucin was used as a branching agent.

The amount of the unreacted branching agent and COD before extraction with methylene chloride were 130 mg/L and 198 mg/L, respectively. The amount of the unreacted branching agent and COD after extraction with methylene chloride were 129 mg/L and 198 mg/L, respectively. The average molecular weight of the polycarbonate was 22,800.

The viscosity average molecular weights of the polycarbonates obtained, CODs after extraction with methylene chloride, and partition coefficients of the branching agents used are shown in Table 1.

TABLE 1

|  | Viscosity Average Molecular Weight[1] | CODs After Extraction With Methylene Chloride (mg/L) | Partition Coefficient[2] |
|---|---|---|---|
| Example 1 | 24100 | 4 | 2 |
| Example 2 | 24700 | 6 | 2 |
| Example 3 | 26700 | 0 | 4 |
| Example 4 | 26500 | 0 | 4 |
| Example 5 | 27000 | 0 | 200 |
| Example 6 | 26800 | 0 | 200 |
| Example 7 | 26800 | 0 | 180 |
| Example 8 | 26500 | 0 | 180 |
| Example 9 | 27000 | 0 | 150 |
| Example 10 | 26800 | 0 | 150 |
| Example 11 | 27200 | 0 | 140 |
| Example 12 | 27000 | 0 | 140 |
| Comparative Example 1 | 23200 | 160 | 0.01 |
| Comparative Example 2 | 22800 | 196 | 0.01 |

[1] Calculated from a viscosity of a methylene chloride solution at 20° C. as measured with a Ubbellohde viscometer.
[2] To a 1:1 (by weight) mixture of water and methylene chloride was added 0.1 wt % of a branching agent, and the resulting mixture was agitated for 10 minutes with an agitator. Then, the Partition Coefficient was determined from a ratio of the concentration of the branching agent in methylene chloride layer to the concentration of the branching agent in aqueous layer.

What is claimed is:

1. A process for producing a branched polycarbonate by an interfacial polycondensation method comprising condensing a first reaction mixture comprising an inert organic solvent, an alkaline aqueous solution of divalent phenol, a branching agent and phosgene, said branching agent having a partition coefficient, defined as a ratio of concentration in inert organic solvent/concentration in water, of at least 1 to form a second mixture containing a polycarbonate oligomer or a polycarbonate and unreacted branching agent, separating said second mixture into an organic solvent layer and an aqueous layer which contains unreacted branching agent, extracting the unreacted branching agent from said aqueous layer with inert organic solvent, and recycling said inert organic solvent which contains the unreacted branching agent extracted from the aqueous layer to the first reaction mixture.

2. The process as claimed in claim 1 wherein the first reaqction mixture is obtained by introducing phosgene into a mixture comprising the inert organic solvent, the alkaline aqueous solution of divalent phenol, and the branching agent, and then reacting.

3. The process as claimed in claim 1 wherien the first reaction mixture is obtained by introducing phosgene into a mixture comprising an inert organic solvent and an alkaline aqueous solution of divalent phenol and then reacting, and followed by adding a branching agent and then reacting.

4. The process as claimed in claim 1, 2 or 3 wherein the inert organic solvent is methylene chloride.

5. The process as claimed in claim 1, wherein the branching agent is selected from the group consisting of 2,4,4'-trihydroxybenzophenone, 1,1,1-tris(4'-hydroxyphenyl)ethane, α,α',α''-tris(4-hydroxyphenyl)-1,3,5-triisopropylbenzene, 1-(α-methyl-α-(4-hydroxyphenyl)ethyl)-4-(α'-α'-bis(4-hydroxyphenyl)-ethyl)benzene, 2,6-bis(2'-hydroxy-5'-methylbenzyl)-4-methylphenol and 2,4,4-trimethyl-2',4',7-trihydroxyflavan.

6. The process as claimed in claim 1 wherein the branching agent is 1,1,1-tris(4'-hydroxyphenyl)ethane.

7. The process as claimed in claim 1, wherein the divalent phenol is a biphenol.

8. The process as claimed in claim 1, wherein the branching agent is 1,1,1-tris(4'-hydroxyphenyl)ethane and the divalent phenol is biphenol A.

9. The process as claimed in claim 1, wherein the branching agent has a partition coefficient of 1 to 200.

10. The process as claimed in claim 1, wherein the branching agent has a partition coefficient of 3 to 200, said partition coefficient measured after agitation for at least 10 minutes.

11. The process as claimed in claim 10, wherein the branching agent content of the resulting branched polycarbonate is in an amount of 0.05 to 2 mole % per the divalent phenol.

12. The process as claimed in claim 10, wherein the branching agent content of the resulting branched polycarbonate is in an amount of 0.1 to 1.0 mole % per the divalent phenol.

13. The process as claimed in claim 11, wherein the solvent is selected from the group consisting of dichloromethane, 1,1-dichlorethane, 1,2-dichloroethane, 1,1,1-trichloroethane, 1,1,2-trichloroethane, 1,1,1,2-tetrachloroethane, 1,1,2,2-tetrachloroethane, pentachloroethane, hexachloroethane, chlorobenzene, acetophenone and mixtures thereof.

14. The process as claimed in claim 13, wherein the divalent phenol is selected from the group consisting of 2,2-bis(4-hydroxydiphenyl)propane, bis(4-hydroxyphenyl)methane, bis(4-hydroxyphenyl)phenylmethane, bis(4-hydroxyphenyl)-naphthylmethane, bis(4-hydroxyphenyl)-(4-isopropylphenyl) methane, diphenyl-bis(4-hydroxyphenyl)methane, bis(3,5-dichloro-4-hydroxyphenyl)methane, bis (3,5-dimethyl-4-hydroxyphenyl)methane, 1,1-bis(4-hydroxyphenyl)ethane, 1-naphthyl-1,1-bis(4-hydroxyphenyl)ethane, 1-phenyl-1,1-bis-(hydroxyphenyl)ethane, 1,2-bis(4-hydroxyphenyl)ethane, 2-methyl-1,1-bis(4-hydroxyphenyl)propane, 2,2-bis(3,5-dimethyl-4-hydroxyphenyl)propane, 1-ethyl-1,1-bis(4-hydroxyphenyl)-propane, 2,2-bis(3,5-dichloro-4-hydroxyphenyl)propane, 2,2-bis (3,5-dibromo-4-hydroxyphenyl)propane, 2,2-bis(3-chloro-4-hydroxyphenyl)propane, 2,2-bis(3-methyl-4-hydroxyphenyl)-propane, 2,2-bis(3-fluoro-4-hydroxyphenyl)-propane, 1,1-bis (4-hydroxyphenyl)butane, 2,2-bis(4-hydroxyphenyl)butane, 1,4-bis(4-hydroxyphenyl)butane, 2,2-bis(4-hydroxyphenyl)pentane, 4-methyl-2,2-bis(4-hydroxyphenyl) pentane, 1,1-bis(4-hydroxyphenyl)cyclohexane, 1,1-bis(3,5-dichloro-4-hydroxyphenyl)-cyclohexane, 2,2-bis(4-hydroxyphenyl)hexane, 4,4-bis(4-hydroxyphenyl)heptane, 2,2-bis(4-hydroxyphenyl)nonane, 1,10-bis(4-hydroxyphenyl)decane, 1,1-bis(4-hydroxyphenyl)-cyclododecane, bis(4-hydroxyphenyl)sulfone, bis(3,5-dimethyl-4-hydroxyphenyl)sulfone, bis (3-chloro-4-hydroxyphenyl)sulfone, bis(4-hydroxyphenyl)ether, bis(3,5-dimethyl-4-hydroxyphenyl)ether, 4,4'-dihydroxybenzophenon, 3,3',5,5'-tetramethyl-4,4'-dihydroxybenzophenone; bis (4-hydroxyphenyl)sulfide, bis(3-methyl-4-hydroxyphenyl)sulfide, bis (3,5-dimethyl-4-hydroxyphenyl) sulfide, bis(4-hydroxyphenyl)sulfoxide, 4,4'-dihydroxydiphenyl, hydroquinone, resorcinol, methylhydroquinone, 1,5-dihydroxynaphthalene and 2,6-dihydroxynaphthalene.

15. The process as claimed in claim 14, wherein the branching agent is selected from the group consisting of 2,4,4'-trihydroxybenzophenon, 2,2',4,4'-tetrahydroxybenzophenone, 2,4,4'-trihydroxydiphenylether, 2,2',4,4'-tetrahydroxydiphenylether, 2,4,4'-trihydroxydiphenyl-2-propane, 2,2-bis(2,4-dihydroxy)propane, 2,2',4,4'-tetrahydroxydiphenyl-methane, 2,4,4'-trihydroxydiphenylmethane, 1-($\alpha$-methyl-$\alpha$-(4-hydroxyphenyl) ethyl-4-($\alpha'$,$\alpha'$-bis(4-hydroxyphenyl)ethylbenzene, $\alpha$,$\alpha'$,$\alpha''$-tris (4-hydroxyphenyl)-1,3,5-triisopropylbenzene, 2,6-bis(2'-hydroxy-5'-methylbenzyl)-4-methylphenol, 4,6-dimethyl-2,4,6-tris(4'-hydroxyphenyl)-heptane-2,4,6-dimethyl-2,4,6-tris-(4'-hydroxyphenyl)-heptane, 1,3,5-tris(4'-hydroxyphenyl)-benzene, 1,1,1-tris(4'-hydroxyphenyl)-ethane, 2,2-bis (4,4-bis(4'-hydroxyphenyl) cyclohexyl)-propane, 2,6-bis(2'-hydroxy-5'-isopropylbenzyl)-4-isopropylphenol, bis(2-hydroxy-3-(2'-hydroxy-5'-isopropylbenzyl)-5-methylphenyl)-methane, tetrakis(4-hydroxyphenyl) methane, tris(4-hydroxy-phenyl)phenylmethane, 2',4',7-trihydroxyflavan, 2,4,4-trimethyl-2',4',7-trihydroxyflavan, and 1,3-bis(2',4'-dihydroxyphenylisopropyl)benzene.

16. The process as claimed in claim 15, wherein the divalent phenol is dissolved in an aqueous solution of an alkali metal hydroxide selected from the group consisting of sodium hydroxide, potassium hydroxide, lithium hydroxide and cesium hydroxide to prepare the alkaline aqueous solution.

17. The process as claimed in claim 16, wherein the condensing is in the presence of one or both of a molecular weight controller and a catalyst, said molecular weight controller selected from the group consisting of phenol, $C_1$-$C_4$-alkylphenol, pentabromophenol and p-cumylphenol and said catalyst selected from the group consisting of tert-amines and halides of quaternary ammonium.

18. The process as claimed in claim 17, wherein the condensing is conducted at a temperature of 0 to 50° C. for at least 10 minutes.

19. The process as claimed in claim 18, wherein the aqueous layer has a pH of not more than 10 and the ratio of the aqueous layer to the organic solvent is 1:0.5 to 1:2.

* * * * *